United States Patent [19]

Hart et al.

[11] Patent Number: 4,557,181

[45] Date of Patent: Dec. 10, 1985

[54] BRAKE CYLINDER/AIR RESERVOIR DEVICE

[75] Inventors: James E. Hart, Trafford; Willard P. Spalding, Penn Hills; Allen W. Kyllonen, Plum, all of Pa.

[73] Assignee: American Standard Inc., Wilmerding, Pa.

[21] Appl. No.: 561,026

[22] Filed: Dec. 13, 1983

[51] Int. Cl.[4] ............................................. F15B 11/16
[52] U.S. Cl. ................................. 91/519; 91/47; 91/417 R; 91/416; 91/394; 285/133 R; 92/59; 92/108
[58] Field of Search ................ 91/47, 51, 417 R, 235, 91/321, 416, 410, 403, 519, 394; 92/59, 108; 285/133 R

[56] References Cited

U.S. PATENT DOCUMENTS

| | | | |
|---|---|---|---|
| 1,768,799 | 7/1930 | Stanley | 92/59 |
| 2,511,883 | 6/1950 | Thierry | 91/519 |
| 2,916,015 | 12/1959 | Jeffery | 91/47 |
| 2,956,704 | 8/1960 | Andrews | 91/403 |
| 3,068,841 | 12/1962 | Robbins et al. | 91/519 |
| 3,272,088 | 9/1966 | Kistler | 92/59 |
| 3,817,152 | 6/1974 | Viron | 91/519 |
| 4,157,194 | 6/1979 | Takahashi | 285/133 R |
| 4,316,597 | 2/1982 | Goodman et al. | 92/108 |
| 4,339,155 | 7/1982 | Hart | 303/38 |
| 4,418,799 | 12/1983 | Hart et al. | 92/245 |

Primary Examiner—Robert E. Garrett
Assistant Examiner—Richard S. Meyer
Attorney, Agent, or Firm—G. J. Falce

[57] ABSTRACT

A combined brake cylinder/air reservoir device in which a relatively small, tubular-shaped piston in a positioning chamber is connected to a larger power piston having an application chamber on one side and a release chamber on the other side in which air is stored in place of separate reservoirs. A replaceable cylinder liner is provided to receive different-sized power pistons. During a brake application, the power piston enters the cylinder liner and is displaced from the liner during brake release to provide free air flow between the application and release chambers and thereby facilitate piston return movement by means of a return spring. A dynamic pressure seal between the application chamber and positioning chamber engages the outer periphery of the tubular-shaped small piston, while a smaller diameter dynamic pressure seal between the release chamber and atmosphere engages the inner periphery of the tubular-shaped small piston. This permits the seals to be located longitudinally in the same general area by nesting them, one within the other, thereby permitting the piston stroke to be increased without greatly increasing the longitudinal dimension of the cylinder/reservoir device.

37 Claims, 1 Drawing Figure

BRAKE CYLINDER/AIR RESERVOIR DEVICE

BACKGROUND OF THE INVENTION

The present invention is concerned with brake apparatus for railway vehicles, and particularly to such brake apparatus as disclosed in U.S. Pat. No. Re. 30,408, assigned to the assignee of the present application.

In the above-mentioned Reissue patent, there is disclosed a dual-piston brake cylinder device that is arranged to provide storage of sufficient air as necessary to develop the desired brake forces, without the need for conventional separate air reservoirs. The dual pistons are tandem-connected, one being larger than the other. The larger piston cooperates with the brake cylinder body to form air storage chambers on its opposite sides.

During brake release, air is supplied to these storage chambers by a control valve device that is operative in response to variations in train brake pipe pressure. When a brake application is initiated, the control valve device connects air from one side of the larger piston to a corresponding side of the smaller piston. A one-way check valve device is provided to effect pressure equalization between the opposite chambers of the larger piston to permit movement of the dual pistons in a brake-application direction under the influence of the pressure acting on the smaller piston. Once the tandem-connected pistons are in application position, the control valve releases pressure from the opposite side of the larger piston to establish a pressure differential thereacross and, accordingly, produce a braking force.

In order to develop consistent braking forces from a wide range of initial pressures corresponding to the desired train charge, it was believed necessary in the development of the foregoing brake apparatus to design the larger piston, hereinafter referred to as the power piston, with equal effective pressure areas subject to the air stored under pressure in the chambers on the opposite sides of the power piston. Such a design is shown in U.S. Pat. No. 4,339,155, issued July 13, 1982, and assigned to the assignee of the present application. If either side of the power piston had a different pressure area than the other, the piston output force would vary with identical pressure reductions, when making these pressure reductions from different initial pressures. This, in turn, would result in the power piston force being pressure sensitive because it would vary by the product of the area difference and the prevailing pressure.

In order to assure equal effective pressure areas across the power piston, as provided in U.S. Pat. No. 4,339,155, it will be noted that the diameter of the front dynamic seal, which seals chamber 14 from atmosphere, is exactly the same as the rear dynamic seal, which seals chamber 13 from chamber 11. In making these seals the same diameter, there is no opportunity to "nest" or "telescope" them for the purpose of saving space. Each of the aforementioned dynamic seals, in addition to the power piston seal itself, requires sufficient longitudinal distance to accommodate the maximum piston stroke. Consequently, the minimum longitudinal dimension of the brake cylinder device employed in the foregoing brake apparatus is determined by the number of dynamic seals (three) multiplied by the maximum piston stroke.

Therefore, in order to limit the longitudinal dimension of the brake cylinder so as to fit within the space normally available, the maximum piston stroke was selected to be approximately 6", or in other words, one-half the stroke of a standard AB/D-type brake cylinder having a 12" piston stroke.

Since the brake rigging on freight brake cars is designed to accommodate the standard 12" piston stroke of an AB-type brake cylinder, the brake apparatus as shown in U.S. Pat. No. 4,339,155, having the short 6" piston travel, requires the present brake rigging and/or lever ratio to be changed to accommodate the shorter piston travel. This entails an additional expense which offsets and adversely affects the projected economic advantages of the combined brake cylinder/air reservoir device when used to retrofit existing AB/D-type brake equipment.

SUMMARY OF THE INVENTION

An object of the present invention, therefore, is to provide a combined brake cylinder/air reservoir device capable of replacing the standard AB/D-type brake cylinder without requiring any change in car brake rigging and/or lever ratio.

Another object of the invention is to provide a combined brake cylinder/air reservoir device having an improved operating response.

Another object of the invention is to provide a single, standard size cylinder in which various sizes of power pistons may be employed without a resultant change in the volume of air stored in the cylinder.

These objectives are achieved in the present invention by providing a brake cylinder device for a railway vehicle having a dual-piston assembly including a larger power piston and a smaller positioning piston. The larger power piston forms a release chamber on one side and an application chamber on the other side in which air is stored under pressure for use in actuating the brake cylinder device and, accordingly, applying the vehicle brakes. The smaller positioning piston of the dual-piston assembly is initially pressurized during a brake-application to move the dual-piston assembly to the application position with low force and thus low air consumption. Air stored in the release chamber is transferred into the application chamber to accommodate movement of the power piston with the positioning piston. In the application position, air in the release chamber is exhausted to establish a pressure differential across the power piston to produce high braking force corresponding to the amount of air exhausted.

The dynamic pressure seals employed to seal the release and application chamber air from leaking to atmosphere and to the positioning chamber, respectively, are arranged to seal on different diameters of the dual-piston assembly. Such an arrangement eliminates the necessity to space the seals longitudinally apart from each other an amount corresponding to the piston stroke, and thus, makes possible a brake cylinder device having a shorter longitudinal dimension for a given piston stroke. In the case of applicants' development of a commercial embodiment of a combined brake cylinder/air reservoir device, this permits a conventional-sized brake unit to be designed, having a piston stroke conforming to the standard AB/D brake cylinder piston stroke, so that no modification of existing car brake rigging is required. Consequently, in replacing a standard AB/D brake cylinder with a combined brake cylinder/air reservoir device, according to the present invention, no additional costs are incurred to modify the existing rigging and, therefore, full realization of the economic benefits are made possible by this new long stroke brake development, specifically a combined brake cylinder/air reservoir device and the related control valve therefor.

In arranging the aforementioned dynamic seals, so as to seal on different diameters of the dual-piston assembly, it will be apparent that a differential effective pressure area is created across the power piston. This affords several advantages pertaining to the brake-release function. Firstly, by making the seal between the release chamber and atmosphere smaller than the other seal, the resultant differential pressure area is effective to provide a net force differential across the power piston in the brake-release direction when pressure equalization between the application and release chambers occurs during brake-release. Consequently, the release spring can be made substantially lighter and is thus less costly and more compact. Secondly, it is apparent that the differential pressure area of the power piston renders the power piston pressure-sensitive, i.e., for different initial pressures, the pressure equalization across the piston during brake-release will produce different piston forces. This has been found to be advantageous in the sense that it counteracts the friction of the dynamic seal associated with the power piston, which seal is also pressure-sensitive. For example, the higher the equalization pressure in the application and release chambers, the higher the frictional force exerted by the dynamic seal of the power piston in resisting movement of the dual-piston assembly to release position.

The power piston operates in a cylinder liner during application of braking force, but is displaced from the liner by the action of the return spring following release of the braking force. This provides for free, unrestricted air flow between the application and release chambers to hasten movement of the power piston to full release position.

In addition, the cylinder liner makes it possible to form the release chamber air recess port in a localized area in proximity with the application chamber, positioning chamber, and emergency chamber access ports, as opposed to forming this access port at a remote point beyond the power piston when the power piston is at the end of its application stroke, which is a considerable distance removed from the adjacent ports when the piston stroke conforms to the standard AB/D cylinder piston stroke. Thus, the various chamber access ports can be kept within a localized area and still be straight-through ports. This gives the advantage of a simplified design of the brake cylinder/air reservoir device.

Another advantage is in the fact that the cylinder liner offers the possibility of providing various effective cylinder sizes by using different size liners and power pistons within a standard-sized cylinder housing. This, in turn, allows equivalent volumes in each of the cylinder air chambers to be maintained regardless of the selected cylinder size, which is the most important factor in permitting a single, standard control valve with standard chokes to be used with the standard cylinder housing. This flexibility is of significant commercial benefit.

BRIEF DESCRIPTION OF THE DRAWING

These objects and advantages, as well as other features of the invention, will become more apparent from the following more detailed explanation, when taken with the single FIGURE drawing showing a sectional view of the combined brake cylinder/air reservoir device of the invention, with an appropriate control valve and a brake pipe connected thereto, shown in outline.

DESCRIPTION AND OPERATION

Figure 1:
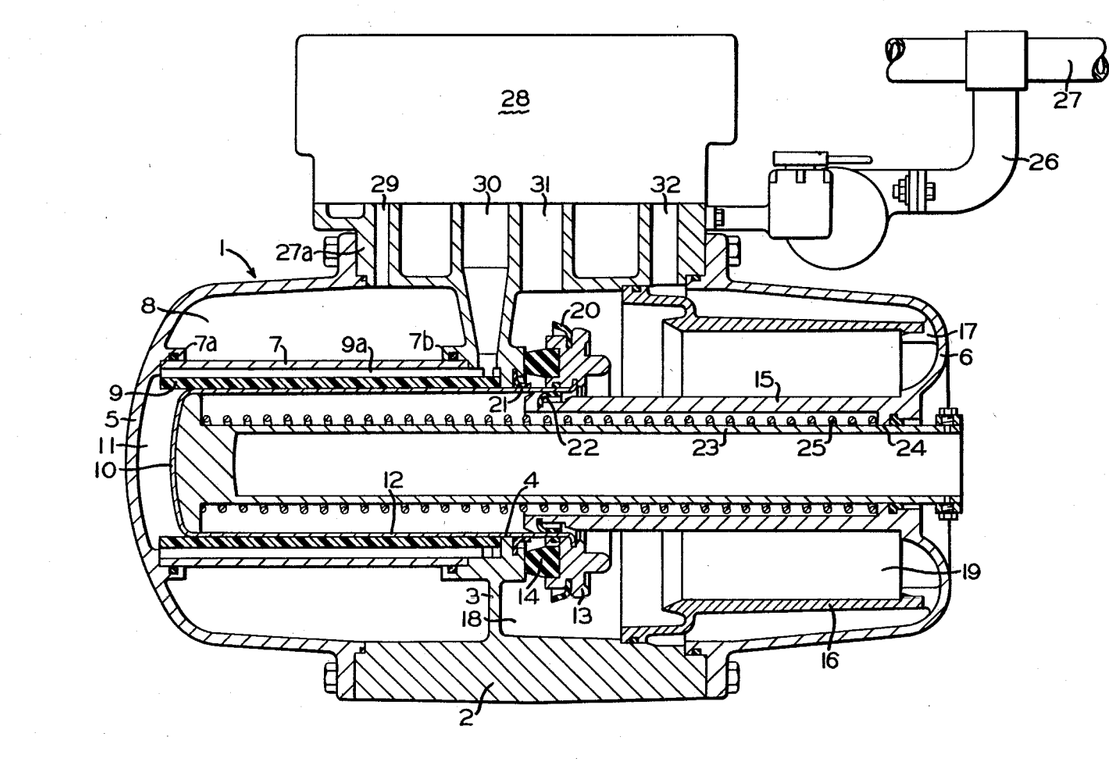

In a preferred embodiment of the invention, there is shown a combined brake cylinder/air reservoir device 1 including a main casting 2 having a partition forming a pressure head 3 with a central opening 4 in pressure head 3. A back cover 5 is bolted to the one side of main casting 2 and an end cover 6 is bolted to the opposite side of main casting 2. A cylindrical tube 7 extends longitudinally between pressure head 3 and back cover 5, thereby forming an annular emergency chamber 8 about the outer periphery of tube 7. A fluted guide sleeve 9 is disposed within tube 7, such that its opposite ends also extend between pressure head 3 and back cover 5. Longitudinal passageways 9a are formed by the fluted sleeve 9 and tube 7. The guide sleeve 9 is aligned axially concentric with central opening 4 and has an inside diameter substantially the same as the diameter of central opening 4. Slidably disposed within guide sleeve 9 is a tubular-shaped positioning piston 10 that forms, in cooperation with sleeve 9 and back cover 5, a positioning chamber 11. A fluid pressure seal is provided between emergency chamber 8 and positioning chamber 11 by an O-ring seal 7a which is located between brake cover 5 and one end of tube 7, and by an O-ring seal 7b which is located between pressure head 3 and the other end of tube 7.

Positioning piston 10 is of unitary construction by reason of a piston pressure head being integral with a tubular-shaped, elongated body 12 to which is attached a power piston 13 having a diameter larger than the diameter of positioning piston 10. Being interconnected, positioning piston 10 and power piston 13 form a dual-piston assembly that moves as a unit between a brake-release position and a brake-application position. A stop bumper 14 is carried by power piston 13 for engagement with pressure head 3 in the brake-release position of the dual-piston assembly, as shown. A cylindrical sleeve 15 of end cover 6 projects inwardly toward pressure head 3 to provide a sealing surface for piston 13.

An annular cylinder liner 16 is secured at one end to main casting 2 and supported at the other end by a plurality of annularly-spaced lugs 17 formed on end cover 6. The inside diameter of cylinder liner 16 is substantially the same as the outside diameter of power piston 13. By unbolting end cover 6, the piston assembly and cylinder liner may be withdrawn from the main casting and, if different braking power is desired, replaced with a piston assembly having a different sized power piston. A cylinder liner having a diameter corresponding to the replacement power piston may then be installed in main casting 2, as explained above, to accommodate the different sized power piston. As the power piston size and thus the diameter of liner 16 increases, the thickness of the cylindrical wall of the liner is reduced so that the volume of chambers 18 and 19 remain unchanged for a purpose hereinafter-discussed.

The end of cylinder liner 16 adjacent power piston 13 is spaced longitudinally from the power piston when the dual-piston assembly is in release position, as shown. Until power piston 13 enters the cylinder liner 16 during an application stroke, free air flow between opposite sides of power piston 13 occurs. This spacing between power piston 13 and the end of liner 16 is of particular significance during brake-release movement of the dual-piston assembly, as hereinafter-explained. When the power piston enters the cylinder liner 16, an application chamber 18 is formed on one side of the power piston and a release chamber 19 is formed on the opposite side, it being understood that the combined volume of chambers 18 and 19 is substantially greater than the maximum volume of chamber 11. The volumetric dimension of chamber 11 increases by displacement of positioning piston 10 during movement of the dual-piston assembly toward brake-application position and is maximum in the application position. An annular pressure seal 20, carried on the periphery of power piston 13, makes sealing engagement with the cylinder wall of liner 16 to establish a pressure seal between chambers 18 and 19. In the release position shown, fluid pressure communication is established between chambers 18 and 19, by way of the space between piston 13 and the adjacent end of liner 16. At this point, chambers 18 and 19 are in effect, a single chamber, until piston 13 enters into sealing engagement with liner 16 during subsequent movement toward the brake-application position.

As an alternative arrangement, liner 16 may be installed as explained, but having the one end extending toward partition 3, so as to contain power piston 13 through the full length of travel thereof. In this regard, the one end of liner 16 is provided with at least one axially elongated opening in the cylinder wall via which air in chambers 18 and 19 may flow unrestricted passed seal ring 20 to provide equalization therebetween during movement of the dual-piston assembly toward brake-release position.

A fluid pressure seal ring 21 is carried on pressure head 3 about the central opening 4, so as to engage the outer periphery of the tubular-shaped body 12 of positioning piston 10 and thereby maintain a pressure-tight seal between pressure chambers 18 and 11. Another fluid pressure seal ring 22 is carried on the outer periphery of cylindrical sleeve 15 near its free end, so as to engage the inner periphery of tubular-shaped positioning piston 10 and thereby maintain a pressure-tight seal between chamber 19 and atmosphere.

It is important to note at this point that since these dynamic seal rings 22 and 21 have different sealing diameters, by reason of sealing against the inner and outer circumferential surfaces of the tubular body 12 interconnecting positioning piston 10 with power piston 13, it is possible to place the seals in the same general area with respect to their longitudinal relationship. This overlapping of the seals makes possible a relatively long piston stroke, since the longitudinal dimension of the combined brake cylinder/air reservoir device only increases by an amount corresponding substantially to the piston stroke increase. However, a differential pressure area of power piston 13 results, whereas in earlier designs, the desire to maintain equal effective pressure areas across the power piston necessitated making the aforementioned seals the same diameter. It was, therefore, required that the seals be spaced-apart a distance corresponding to the piston stroke. Accordingly, these earlier designs required a relatively short piston stroke in order to limit the longitudinal dimension of the combined brake cylinder/air reservoir device. In the present design, the differential pressure area across power piston 12 serves a purpose to be explained hereinafter.

A hollow piston rod 23 is located within the tubular body 12 of positioning piston 10 and the inwardly-projecting cylindrical sleeve 15 of end cover 6, so as to engage the head of positioning piston 10 at one end. The other end of piston rod 23 extends through an environmentally sealed guideway 24 of end cover 6 for connection with brake rigging in a conventional manner to transmit brake forces generated at pistons 10 and 13. A piston return spring 25 acts between the one end of piston rod 23 that is engageable with the head of positioning piston 10 and a shoulder forming the sealed guideway 24 to urge the dual-piston assembly toward release position.

A branch pipe 26 is connected between a brake pipe 27 and a mounting boss 27a that receives a control valve device 28, which may be similar to that described in U.S. Pat. No. 4,405,182. Mounting boss 27a includes a port 29 leading to emergency chamber 8, a port 30 leading to fluted passageway 9a, and ports 31, 32 leading to the respective application and release chambers 18, 19.

During initial charging of the brake equipment, pressure chambers 8, 18 and 19 are stored with compressed air supplied by way of brake pipe 27, branch pipe 26, control valve device 28, and the respective ports 29, 31 and 32 of main casting 2. The dual-piston assembly comprising positioning piston 10 and power piston 13 is maintained in release position, as shown, under the influence of return spring 25 and the force differential across power piston 13 provided by the differential piston area subject to the compressed air stored in chambers 18 and 19.

In order to initiate a service brake application, air in brake pipe 27 is reduced at a service rate. During the initial stage of a service brake application, hereinafter referred to as a minimum service application, compressed air is connected from charged chambers 18 and 19, to the previously evacuated positioning chamber 11. As this air pressure in positioning chamber 11 builds up in attempting to equalize with the higher air pressure in chambers 18 and 19, a force is developed on positioning piston 10 in a right-hand direction. When this force exceeds the force of return spring 25, the differential force exerted by power piston 13, and friction, the dual-piston assembly will be forced in a brake-application direction, carrying along piston rod 23. During this movement of the dual-piston assembly, unrestricted flow of compressed air takes place from release chamber 19 to application chamber 18 via the space between the power piston 13 and the adjacent end of cylinder liner 16, to accommodate the displacement of power piston 13. A one-way check valve (not shown) is also provided in control valve device 28 to accommodate displacement of air from release chamber 19 to application chamber 18 when piston 13 makes full sealing engagement with cylinder liner 16, as the dual-piston assembly moves toward full application position.

Because of the differential pressure area of power piston 13, it will be appreciated that during the aforementioned movement of the dual-piston assembly toward application position, the total volume of chambers 18 and 19 is reduced slightly. This results in the pressure drop in chambers 18 and 19, during equalization of pressure with positioning chamber 11, being less than would occur in the case where the combined volume of chambers 18 and 19 remained constant. Thus, where it is desired to obtain a longer piston stroke, the additional air necessary to pressurize positioning chamber 11, due to its increased volumetric displacement, is obtained without any substantial pressure drop in chambers 18 and 19.

When the dual-piston assembly has moved to the application position, a minimum service brake force is exerted by positioning piston 10. It will be further appreciated that the volume of application chamber 18 is increased and the volume of release chamber 19 is decreased. In order to obtain a brake force greater than a minimum service brake force, the air in the reduced volume of chamber 19 is exhausted by control valve 28 an amount corresponding to the reduction of air pressure in brake pipe 27 in excess of a minimum service reduction of brake pipe pressure. The resultant reduction of pressure in release chamber 19 establishes a relatively high differential force across power piston 13 in a brake-application direction, since the pressure in chamber 18 is prevented from equalizing with the pressure in chamber 19 by seal ring 20 and the aforementioned check valve in control valve 28.

During a subsequent brake release operation, air in release chamber 19 is initially connected by control valve device 28 to chamber 18 via a release control choke (not shown) in control valve device 28 to assure a controlled release of braking force. Concurrently, the pressure in positioning chamber 11 is vented to atmosphere. As the pressures across power piston 13 become equalized, return spring 25 plus the differential piston area release force is effective to force the dual-piston assembly toward the release position. Once power piston 13 moves out of engagement with cylinder liner 16, unrestricted flow of air occurs between chambers 18 and 19 to hasten movement of the dual-piston assembly and the car brake shoes to the release position, thereby providing fast visual knowledge of the brake-release. Pressure seal 20 exerts a frictional force on cylinder liner 16 during movement of the dual-piston assembly to the release position to resist such movement. It will be noted, however, that in making seal rings 21 and 22 to seal on different diameters, a larger pressure area of power piston 13 is subject to the air in release chamber 19 than the pressure area subject to air in application chamber 18. This differential pressure area is selected so that a differential force, substantially equal to the frictional force exerted by seal ring 20, is provided across power piston 13. This differential force is pressure-sensitive in that it increases with increasing pressures in a manner very similar to the increasing friction force produced by seal ring 20 as the pressure increases. It will be apparent, therefore, that the friction force opposing movement of the dual-piston assembly to the brake-release position is automatically counteracted, thus avoiding the necessity of a heavier return spring to overcome the seal ring friction, assure brake-release and piston repositioning.

In addition, the fact that the seal rings 21 and 22 have different sealing diameters, so as to be in a sense "nested", one within the other, makes possible a longitudinally compact assembly, which is particularly advantageous where it is desired to provide a relatively long piston stroke, such as the piston stroke employed with the standard AB/D-type brake equipment.

It will be further apparent that by utilizing a replaceable cylinder liner 16, a single, standard-sized device 1 can be employed in which the external dimension remains unchanged and the selected volume of combined chambers 18 and 19 can be kept constant, irrespective of the size of the power piston necessary to provide the required brake force. In keeping the combined volume of chambers 18 and 19 the same with different-sized power pistons, it will be unnecessary to change chokes in control valve device 28 in order to assure a given brake response sensitivity with different brake force requirements.

In addition, the location of port 32 in main casting 2 is unaffected by the length of the piston stroke, due to the cylinder liner 16, which forms an annular space between the cylinder liner 16 and end cover 6 via which air is channeled to and from release chamber 19 by passing through the annularly-spaced support lugs 17 beyond the point of maximum piston travel. Consequently, it is possible to keep the spacing of the access porting 29, 30, 31 and 32 in main casting 2 the same for all piston strokes, further making it possible to manufacture the combined brake cylinder air/reservoir device in a single, standard size.

Having now described the invention, what we claim as new and desire to secure by Letters Patent, is:

1. An actuator device comprising:
   (a) a main cylinder housing having a partition with an axial opening therein;
   (b) a first cylinder on one side of said partition;
   (c) a second cylinder on the opposite side of said partition;
   (d) a support member projecting inwardly from said second cylinder;
   (e) a dual-piston assembly movable between a brake application position and a brake-release position including:
      (i) a positioning piston in the form of an elongated, tubular-shaped body projecting through said opening and having a closed end operatively disposed on said one side of said partition and an open end operatively disposed on said opposite side through which open end said support member extends into said tubular body, said closed end of said positioning piston cooperating with said first cylinder and said one side of said partition to form a positioning chamber; and
      (ii) an annular power piston connected to said tubular body at said open end thereof so as to form in cooperation with said opposite side of said partition and said second cylinder an application chamber, and to form in cooperation with said second cylinder and said support member a release chamber;
   (f) first seal ring means engageable with the outer periphery of said tubular body and said partition for effecting fluid pressure isolation between said positioning chamber and said application chamber; and
   (g) second seal ring means engageable with the inner periphery of said tubular body and said support member for effecting fluid pressure isolation between said release chamber and atmosphere.

2. An actuator device, as recited in claim 1, wherein said first and second seal ring means are engageable with said outer cylindrical surface, respectively, and said inner cylindrical surface of said tubular body within the same general longitudinal area thereof.

3. An actuator device, as recited in claim 1, further comprising first, second and third means for connecting fluid under pressure to and from said positioning chamber, said application chamber and said release chamber, respectively.

4. An actuator device, as recited in claim 1, wherein the area of said power piston subject to said release chamber fluid under pressure is greater than the area of said power piston subject to said application chamber fluid under pressure.

5. An actuator device, as recited in claim 4, wherein the area of said positioning piston subject to said positioning chamber fluid under pressure is less than the area of said power piston subject to said application chamber fluid under pressure.

6. An actuator device, as recited in claim 1, wherein said first cylinder comprises means for guidably supporting axial movement of said positioning piston during movement of said dual-piston assembly between said brake-release position and said brake-application position.

7. An actuator device, as recited in claim 6, wherein said means for guidably supporting axial movement of said positioning piston includes a guide member coaxial with said support member and attached at one end to said partition in axial concentric alignment with said opening therein.

8. An actuator device, as recited in claim 7, wherein said first cylinder further comprises a back cover fixed to said main cylinder housing to which said guide member is attached at the other end thereof.

9. An actuator device, as recited in claim 8, further comprising first and second annular seals between said partition and said one end of said guide member and between said first cylinder back cover and said other end of said guide member, respectively.

10. An actuator device, as recited in claim 9, wherein said guide member cooperates with said first cylinder back cover, said partition, and said main cylinder housing to form an annular emergency chamber surrounding said guide member.

11. An actuator device, as recited in claim 10, further comprising means in said main cylinder housing for connecting fluid under pressure to and from said emergency chamber.

12. An actuator device, as recited in claim 7, further comprising first means in said main cylinder housing for connecting fluid under pressure to and from said positioning chamber.

13. An actuator device, as recited in claim 12, wherein said first means for connecting fluid under pressure to and from said positioning chamber comprises:
(a) a first passage in said partition; and
(b) a second passage longitudinally-arranged in said guide member, one end of said second passage opening into said first passage and the other end of said second passage opening into said positioning chamber.

14. An actuator device, as recited in claim 13, wherein said first seal ring means comprises an annular dynamic pressure seal carried in said opening of said partition between said first passageway therein and said application chamber.

15. An actuator device, as recited in claim 13, wherein said guide member comprises:
(a) an annular sleeve supported at one end by said partition in surrounding relationship with said opening therein and having an inside diameter corresponding generally to the diameter of said opening, said sleeve having at least one longitudinal flute along the outer periphery thereof; and
(b) a cylindrical tube surrounding said annular sleeve in contiguous relationship therewith to form, in cooperation with said longitudinal flute, said second passageway.

16. An actuator device, as recited in claim 15, wherein said first cylinder further comprises a back cover fixed to said main cylinder housing, said cylindrical tube being attached to said first cylinder back cover at the end opposite said one end.

17. An actuator device, as recited in claim 16, further comprising first and second annular seals between said partition and said one end of said cylindrical tube and between said first cylinder back cover and said opposite end of said cylindrical tube, respectively.

18. An actuator device, as recited in claim 17, wherein said cylindrical tube, said first cylinder back cover, said partition, and said main cylinder housing form an annular emergency number surrounding said guide member.

19. An actuator device, as recited in claim 18, further comprising second means in said main cylinder housing for connecting fluid under pressure to and from said emergency chamber.

20. An actuator device, as recited in claim 4, further comprising third seal ring means engageable with said power piston and said second cylinder for effecting fluid pressure isolation between said application chamber and said release chamber.

21. An actuator device, as recited in claim 20, wherein said differential pressure area of said power piston is such that said power piston exerts a force on said dual-piston assembly toward said brake-release position corresponding substantially to the force of resistance of said frictional engagement between said third seal ring and said second cylinder when pressure equalization occurs between said application and release chambers.

22. An actuator device, as recited in claim 21, wherein said second cylinder comprises an annular cylinder liner fixed at one end of said main cylinder housing so as to receive said power piston.

23. An actuator device, as recited in claim 20, wherein said second cylinder comprises an annular cylinder liner extending axially at least the full length of travel of said power piston during said movement of said dual-piston assembly between said brake-application and release positions, said cylinder liner having at least one opening in the cylindrical wall thereof via which fluid under pressure is free to flow in bypass of said third seal rings means during said movement of said dual-piston assembly toward said release position.

24. An actuator device, as recited in claim 27, wherein said third seal ring means comprises an annular seal ring carried by said power piston about the periphery thereof.

25. An actuator device, as recited in claim 23, wherein said at least one opening is elongated in the direction of travel of said power piston.

26. An actuator device, as recited in claim 22, further comprising a piston return spring between said second cylinder and said closed end of said positioning piston within said tubular-shaped body to urge said dual-piston assembly toward said release position.

27. An actuator device comprising:
(a) a main cylinder housing having a partition with an axial opening therein;
(b) a first cylinder on one side of said partition;
(c) a second cylinder on the opposite side of said partition comprising an annular cylinder liner fixed at one end to said main cylinder housing;
(d) a support member projecting inwardly from said second cylinder;

(e) a dual-piston assembly movable between a brake application position and a brake-release position including:
  (i) a positioning piston in the form of an elongated, tubular-shaped body projecting through said opening and having a closed end operatively disposed on said one side of said partition and an open end operatively disposed on said opposite side through which open end said support member extends into said tubular body, said closed end of said positioning piston cooperating with said first cylinder and said one side of said partition to form a positioning chamber; and
  (ii) an annular power piston connected to said tubular body at said open end thereof so as to form in cooperation with said opposite side of said partition and said cylinder liner an application chamber, and to form in cooperation with said cylinder liner and said support member a release chamber, the area of said power piston subject to said release chamber fluid under pressure being greater than the area of said power piston subject to said application chamber fluid under pressure;
(f) first seal ring means engageable with the outer periphery of said tubular body and said partition for effecting fluid pressure isolation between said positioning chamber and said application chamber; and
(g) second seal ring means engageable with the inner periphery of said tubular body and said support member for effecting fluid pressure isolation between said release chamber and atmosphere.
(h) third seal ring means engageable with said power piston and said cylinder liner for effecting fluid pressure isolation between said application and release chambers, said differential pressure area of said power piston being such that said power piston exerts a force on said dual piston assembly toward said brake release position corresponding substantially to the force of resistance of said frictional engagement between said third seal ring and said cylinder liner when pressure equalization occurs between said application and release chambers; and
(i) said power piston being axially displaced from said cylinder liner during said movement of said dual piston assembly toward said release position to permit substantially unrestricted flow of fluid under pressure between said application and release chambers.

28. An actuator device comprising:
(a) a main cylinder housing having a partition with an axial opening therein;
(b) a first cylinder on one side of said partition;
(c) a second cylinder on the opposite side of said partition comprising:
  (i) an annular cylinder liner fixed at one end to said main cylinder housing; and
  (ii) an end cover fixed to said main cylinder housing in surrounding relationship with the outer periphery of said cylinder liner to form in cooperation therewith an annular chamber;
(d) a support member projecting inwardly from said end cover within the inner periphery of said cylinder liner;
(e) a dual-piston assembly movable between a brake application position and a brake-release position including:
  (i) a positioning piston in the form of an elongated, tubular-shaped body projecting through said opening and having a closed end operatively disposed on said one side of said partition and an open end operatively disposed on said opposite side through which open end said support member extends into said tubular body, said closed end of said positioning piston cooperating with said first cylinder and said one side of said partition to form a positioning chamber; and
  (ii) an annular power piston connected to said tubular body at said open end thereof so as to form in cooperation with said opposite side of said partition of said inner periphery of said cylinder liner an application chamber, and to form in cooperation with the inner periphery of said cylinder liner and said support member a release chamber;
(f) first seal ring means engageable with the outer periphery of said tubular body and said partition for effecting fluid pressure isolation between said position chamber and said application chamber;
(g) second seal ring means engageable with the inner periphery of said tubular body and said support member for effecting fluid pressure isolation between said release chamber and atmosphere;
(h) third seal ring means engageable with said power piston and said cylinder liner for effecting fluid pressure isolation between said application and release chambers, said differential pressure area of said power piston being such that said power piston exerts a force on said dual piston assembly toward said brake release position corresponding substantially to the force of resistance of said frictional engagement between said third seal ring and said cylinder liner when pressure equalization occurs between said application and release chambers; and
  (i) said annular chamber having communication with said application and release chambers via a flow path formed between the other end of said cylinder liner and said end cover.

29. An actuator device, as recited in claim 28, further comprising passage means in said main cylinder housing communicating with said annular chamber at a point intermediate said connection of said cylinder liner and said second cylinder end cover to said main cylinder housing for connecting fluid under pressure to and from said release chamber.

30. An actuator device, as recited in claim 29, wherein said point intermediate said connection of said cylinder liner and said second cylinder end cover to said main cylinder lies adjacent said one end of said cylinder liner.

31. An actuator device, as recited in claim 30, wherein said second cylinder end cover is provided with a plurality of annularly-spaced lugs on which said other end of said cylinder liner is supported, said flow path between said other end of said liner and said end cover being between said annularly-spaced lugs.

32. An actuator device, as recited in claim 31, further comprising a piston return spring between said second cylinder and said closed end of said positioning piston within said tubular-shaped body thereof to urge said dual-piston assembly toward said release position.

33. An actuator device, as recited in claim 32, wherein said power piston is displaced from said annular cylinder liner during at least a portion of the said movement of said dual-piston assembly toward said release position by said return spring to permit substantially unrestricted flow of fluid under pressure between said application and release chambers.

34. An actuator device, as recited in claim 28, wherein said support member is tubular-shaped and said second cylinder end cover is provided with an opening into the inner area within said tubular-shaped support member, whereby the inner area of said tubular-shaped body of said positioning piston is vented.

35. An actuator device, as recited in claim 34, further comprising:
(a) an annular shoulder formed at the juncture of said support member with said second cylinder end cover, said shoulder projecting into said opening; and
(b) a return spring bearing against said shoulder and sid closed end of said positioning piston within the cavity of said tubular-shaped body thereof to urge said dual-piston assembly to said release position.

36. An actuator device, as recited in claim 35, wherein said dual-piston assembly further comprises a piston rod disposed within the cavity of said tubular-shaped positioning piston body and said support member with one end bearing against said closed end of said positioning piston and the other end projecting through said opening.

37. An actuator device, as recited in claim 36, wherein said piston rod is guidably supported by engagement with said shoulder.

* * * * *

UNITED STATES PATENT AND TRADEMARK OFFICE
CERTIFICATE OF CORRECTION

PATENT NO. : 4,557,181
DATED : December 10, 1985
INVENTOR(S) : James E. Hart et al It is certified that error appears in the above-identified patent and that said Letters Patent are hereby corrected as shown below:

Column 8, line 58, delete ", respectively,"

line 59, after "surface", insert --, respectively,--

Column 10, line 14, delete "number" and insert --chamber-- line 36, delete "of" and insert --to-- line 46, change "rings" to --ring-- line 48, delete "27" and insert --23-- line 55, delete "22" and insert --31--

Column 12, line 14, delete "of", first occurrence, and insert --and-- line 21, change "position" to --positioning-- line 62, delete "thereof"

UNITED STATES PATENT AND TRADEMARK OFFICE
CERTIFICATE OF CORRECTION

PATENT NO. : 4,557,181

DATED : December 10, 1985

INVENTOR(S) : James E. Hart et al.

It is certified that error appears in the above-identified patent and that said Letters Patent is hereby corrected as shown below:

Column 14, line 2, change "sid" to -- said --.

Signed and Sealed this

Fifth Day of August 1986

[SEAL]

Attest:

Attesting Officer

DONALD J. QUIGG

Commissioner of Patents and Trademarks